March 15, 1955 R. J. EDWARDS 2,704,173
UNLOADING CONTROL FOR TRUCK BODY
Filed April 28, 1954 2 Sheets-Sheet 1
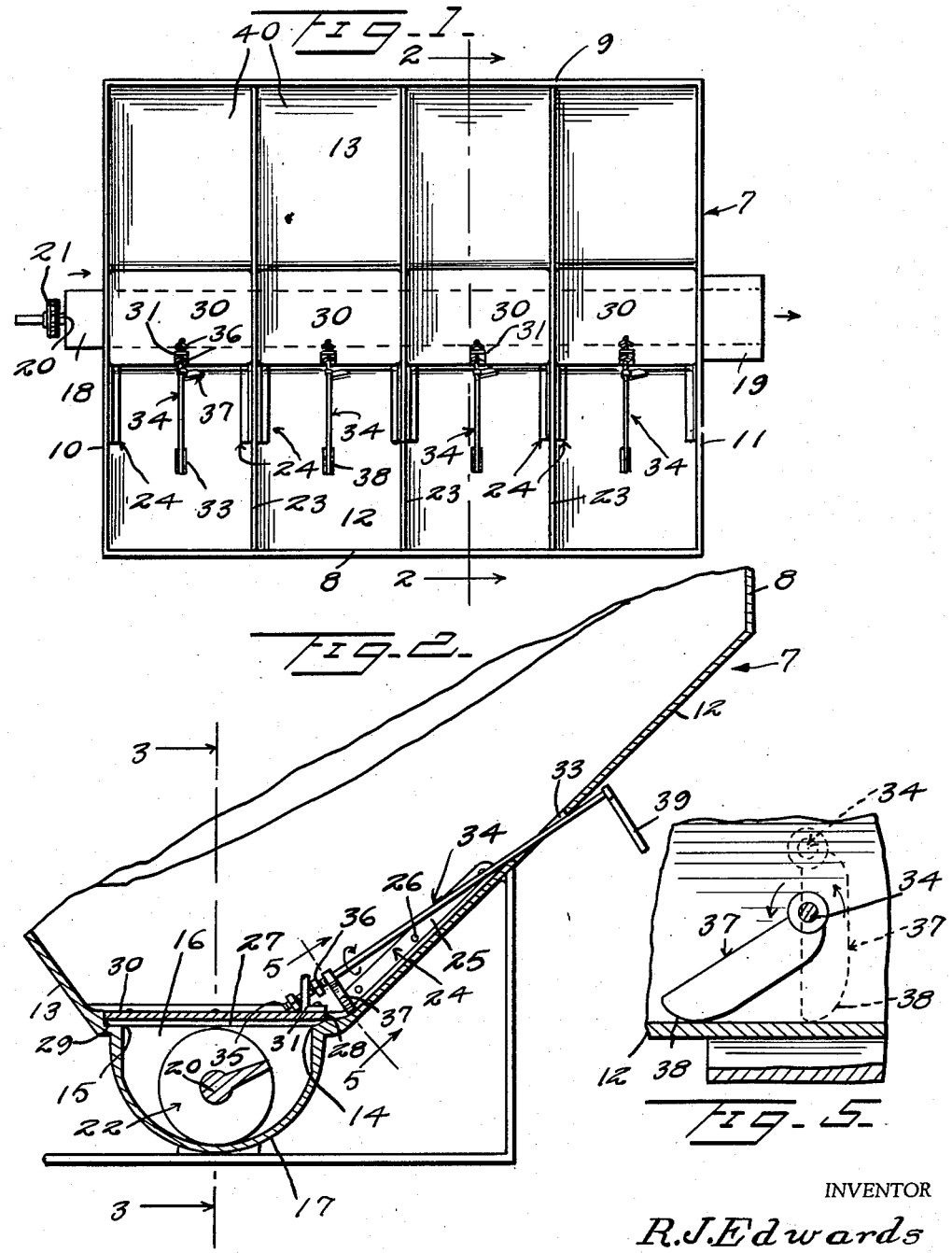
INVENTOR
R. J. Edwards
BY John H. Randolph
ATTORNEY March 15, 1955  R. J. EDWARDS  2,704,173
UNLOADING CONTROL FOR TRUCK BODY
Filed April 28, 1954  2 Sheets-Sheet 2
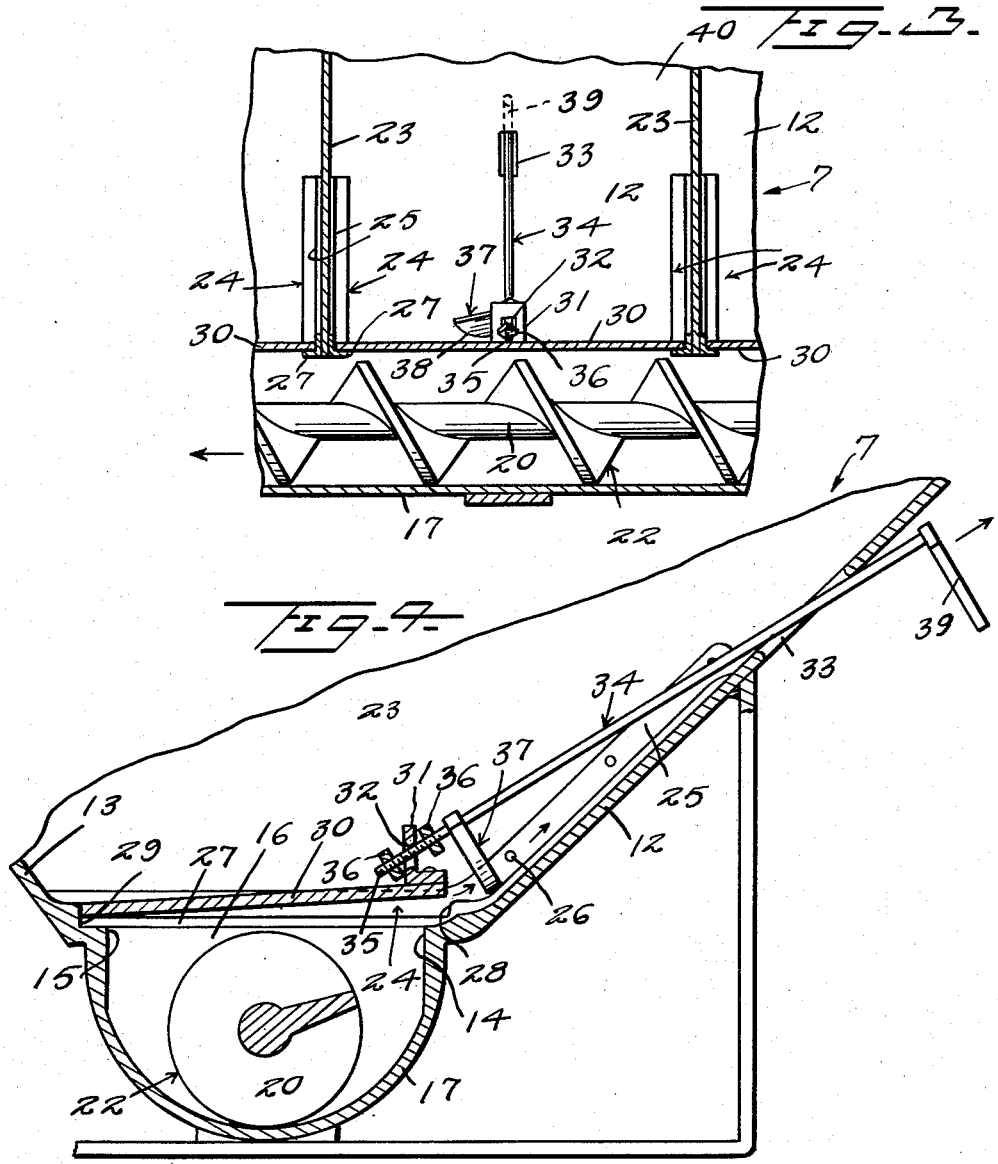
INVENTOR
R. J. Edwards
BY John N. Randolph
ATTORNEY

United States Patent Office 2,704,173
Patented Mar. 15, 1955

2,704,173

UNLOADING CONTROL FOR TRUCK BODY

Ralph J. Edwards, Knoxville, Tenn.

Application April 28, 1954, Serial No. 426,266

6 Claims. (Cl. 222—508)

This invention relates to a novel means for regulating the discharge of a fluent material from a truck body or hopper and has for its primary object to provide a novel manually actuated means for manually moving a valve member to an open position to allow the fluent contents of a truck body or part thereof to be dispensed by gravity therefrom.

Considerable difficulty has been encountered in the past in moving valve means of truck bodies to an open position due to the weight of the fluent material contained thereon, frequently necessitating the provision of relatively complicated mechanical means to effect an opening of the valve.

Accordingly, it is a primary object of the present invention to provide an extremely simple mechanical means which may be manually operated with a minimum of effort to effect the opening of a valve member in the bottom of a truck body and where the valve member is supporting a considerable weight.

Various other objects and advantages of the invention will hereinafter become more fully apparent from the following description of the drawings, illustrating a presently preferred embodiment thereof, and wherein:

Figure 1 is a top plan view of a truck body equipped with the unloading control;

Figure 2 is an enlarged fragmentary cross sectional view thereof taken substantially along a plane as indicated by the line 2—2 of Figure 1;

Figure 3 is a fragmentary longitudinal sectional view taken substantially along a plane as indicated by the line 3—3 of Figure 2;

Figure 4 is an enlarged transverse fragmentary sectional view, similar to Figure 2, showing one of the discharge valves in a partially lifted position preparatory to sliding movement to an open position, and Figure 5 is an enlarged fragmentary sectional view taken substantially along a plane as indicated by the line 5—5 of Figure 2.

Referring more specifically to the drawings, a truck body or hopper for fluent material is illustrated in its entirety in Figure 1 and is designated generally 7. The truck body includes side walls 8 and 9, end walls 10 and 11 and a bottom of substantially V-shaped cross section comprising downwardly and inwardly sloping bottom walls 12 and 13 which extend downwardly and inwardly relatively to one another from the bottom edges of the side walls 8 and 9, respectively. The adjacent longitudinally extending bottom edges of the bottom walls 12 and 13, designated 14 and 15, respectively, terminate in laterally spaced apart relationship to one another to define a relatively wide opening 16 in the bottom of the truck body or hopper 7 which opens into a trough 17. The trough 17 extends from end-to-end of the truck body or hopper 7 and the side edges or rims thereof are formed integral with the bottom edges 14 and 15.

As seen in Figure 1, the trough 17 is provided with tubular extensions projecting from the ends thereof, designated 18 and 19. The extension 18, which projects outwardly from the wall 10, is closed except for providing a bearing for a screw conveyor shaft 20 which extends therethrough and which may be suitably driven as by means of a chain and sprocket wheel drive 21. The shaft 20 forms a part of a screw conveyor 22 which is rotatably disposed in the trough 17 and which is adapted to be revolved in a direction for feeding the contents of the trough from left to right as seen in Figure 1 and through the other outwardly open discharge extension 19.

The body or hopper 7 is preferably provided with a plurality of traverse partition walls 23, as best seen in Figure 1, combining with the end walls 10 and 11 to separate the body or hopper into a plurality of compartments. The bottom edges of the central portions of the partitions 23 terminate immediately above the open bottom 16 or the open top of the trough 17. A rail 24 of angle iron or of angular cross section is secured to each side of each partition 23 and similar rails are secured to the inner sides of the end walls. The rails 24 have vertical flanges 25 which are secured by suitable fastenings 26 to the walls 10, 11 and 23 and said rails have bottom flanges 27 which project laterally away from said walls. The bottom flanges 27 extend between the bottom edges 14 and 15 of the bottom walls, immediately above the open top of the trough 17, and upwardly along the bottom wall 12 for only a portion of the height of said wall 12. Said bottom flanges 27 are each provided with an upwardly offset portion located adjacent to and slightly outwardly of the bottom edge 14 and which forms an inwardly facing shoulder 28 which is preferably inclined upwardly and outwardly. The bottom wall 13, as best seen in Figure 4, is provided with a shoulder 29 which faces inwardly and which is outwardly offset from its bottom edge 15. The shoulder 29 extends upwardly from corresponding ends of the bottom flanges 27 of the guide rails.

Each of the compartments of the body or hopper 7, formed by the end walls 10 and 11 and the partitions 23, is provided with a plate 30 forming a valve which is sized to rest upon the portions of the bottom flanges 27 which are disposed in said compartment and which span the opening 16 thereof. The plate 30 is also of a width to substantially abut against the shoulders 28 and 29, as seen in Figure 2, for effecting closing the open bottom of the compartment when the valve 30 is in a closed position as illustrated in Figures 1, 2 and 3. Each valve 30 has a lug 31 secured thereto and extending upwardly from adjacent the side edge thereof which is disposed in engagement with a shoulder 28, when said valve is in a closed position. The lugs 31 are disposed intermediate of the ends of the valves 30 and each lug is provided with a relatively large, vertically elongated opening 32. As seen in Figures 1 to 4, the bottom wall 12, approximately midway between its upper and lower edges, is provided with vertically or transversely elongated slots 33 which align with the lugs 31 and which are preferably disposed above the upper ends of the guide rails 24.

A valve actuating rod 34 extends loosely through each slot 33. The lower portions of the rods 34 are disposed within the body or hopper 7. Each rod 34 has a threaded lower end 35 which extends loosely through a lug opening 32 and on which is mounted nuts 36 which loosely straddle the lug 31 to permit the rod end 35 to be turned freely in and rocked relatively to the lug 31. A cam member 37, as best illustrated in Figure 5, is fixed to each rod 34 near its threaded lower end 35. Each cam member 37 has a convexly arced portion 38 which is spaced a substantial distance laterally from the axis of the rod 34. The opposite upper ends of the rods 34 are disposed externally of the bottom wall 12 and each terminates in a laterally extending handle portion 39.

Assuming that the valves 30 are in closed positions, as illustrated in Figures 1 to 3 and that the body or hopper 7 is filled or substantially filled with a fluent material, not shown, such as crushed coal, said coal will be retained in the body or hopper 7 separated by the partitions 23 and supported by the bottom walls 12 and 13 and valves 30. The slots 33 are sufficiently narrow to have a relatively close fitting engagement with the rods 34 to prevent escape of the fluent material through said slots. The fluent material contained in the individual compartments 40 of the body or hopper 7, formed by the end walls and partitions 23, may be selectively discharged by gravity into the screw conveyor trough 17 to be conveyed longitudinally of the body 7 by the screw conveyor 22 and discharged through the outlet 19. To accomplish this, the handle 39 of the rod 34, which extends into the compartment 40 from which the fluent material is to be discharged, is manually turned for turning the rod 34 counterclockwise as seen in Figure 5 from its full line position and wherein the cam 37 is disposed as seen in full lines.

This turning movement of the cam 37 will cause its arcuate surface 38 to ride a portion of the bottom wall 12 fulcruming thereon and sliding from left to right as seen in Figure 5 toward a position directly beneath the rod 34. This will exert an upward force on the lower rod end 35 causing said rod end to lift the lugs 31 through which it extends and the side edge of the valve 30, located adjacent said lug. Thus, said side edge will be raised out of engagement with and to a position above the shoulder 28, as seen in Figure 4. When this has been accomplished, an outward pull is exerted on the handle 39 in an upward direction to cause the rod 34 to slide upwardly and outwardly through the slot 33 and so that the valve 30 will slide up the inclined flange portions 27 and to a position along the wall 12 and to one side of the opening 16. During this sliding movement, the rod 34 may be turned in the opposite direction or clockwise as seen in Figure 5 to elevate the cam 37 out of engagement with the wall 12 and so that the valve 30 may assume a position substantially parallel to said wall. It will be readily apparent that as the valve 30 is thus moved to uncover the opening 16 that the contents of the compartment 40 in which said valve 30 is disposed will be dispensed by gravity into the conveyor trough 17. Each of the compartments 40 may be selectively emptied in this manner. It will also be apparent that very little manual force will be required to accomplish the initial lifting of the right-hand edge of the valve 30 as seen in Figure 4 and to thereafter slide the valve 30 substantially edgewise upwardly through the contents of the compartment 40 to the open position of the valve.

After a compartment 40 has thus been emptied a thrust is exerted against the handle 39 to push the rod 34 inwardly through the slot 33 and so that the valve 30 will then slide down the rail bottoms 27 until the leading edge of the valve strikes the shoulder or abutment 29 at which time the trailing right-hand edge, as seen in Figure 4, will have cleared the shoulders 28 so that said edge portion of the valve may drop downwardly back to its fully closed position of Figure 2. The return of the valve 30 to a closed position is accomplished while the cam 37 is still in a raised position as seen in dotted lines of Figure 5.

Various modifications and changes are contemplated and may obviously be resorted to, without departing from the spirit or scope of the invention as hereinafter defined by the appended claims.

I claim as my invention:

1. The combination with a container for fluent material having an outlet opening in the bottom thereof, said container including spaced substantially parallel walls between which said outlet opening extends and an inclined bottom wall extending upwardly at an incline from one side of said outlet opening; guide rails secured to adjacent faces of said substantially parallel walls and extending therefrom toward one another, said guide rails including bottom portions spanning the outlet opening and inclined upper portions extending upwardly from corresponding ends of the bottom portions along said inclined bottom wall, a plate forming a valve slidably engaging said guide rails and sized to seat on the bottom portions of the guide rails and to span and close said outlet opening, a lug secured to and rising from the valve near an edge thereof located adjacent said inclined bottom wall when the valve is positioned for closing said outlet opening, a rod having a lower end turnably and swingably connected to said lug and extending upwardly therefrom, said inclined bottom wall having an elongated slot through which said rod loosely extends for locating the opposite upper end of the rod externally of the inclined bottom wall, said upper end of the rod being adapted to be manually engaged and pulled for sliding the valve off the bottom rail portions and onto said inclined rail portion to expose said outlet opening.

2. In a structure as in claim 1, and abutment means rising from the ends of said bottom rail portions located remote from the inclined bottom wall for limiting sliding movement of the valve downwardly and toward a closed position.

3. In a structure as in claim 2, said rails having upwardly extending portions disposed between the bottom portions and inclined portions thereof forming shoulders facing said abutment means between which shoulders and the abutment means opposite edges of the valve are disposed when the valve is in a closed position resting on said bottom rail portions, and means for exerting a lifting force on the lower end of the rod and valve lug for rocking the valve from a fully closed position for elevating the edge thereof, located adjacent the rod, out of engagement with said shoulders.

4. In a structure as in claim 3, said means comprising a cam fixed to said rod near its lower end and having a cam surface spaced laterally from the axis of the rod, said rod being initially rotated in one direction for swinging the cam surface toward a position beneath the rod whereby the cam surface slides and fulcrums on the inclined bottom for displacing the lower end of the rod upwardly.

5. In a structure as in claim 4, and a handle fixed to and extending laterally from the upper end of the rod for exerting a torsional and pulling force thereon.

6. The combination with a container for a fluent material including opposite spaced walls, said container having an outlet opening in the bottom thereof disposed between portions of said walls, and an inclined bottom forming a part of said container and extending at an incline upwardly from a side of the outlet opening and between said walls, rail members secured to the bottom portions of said walls on adjacent sides thereof and spanning said outlet opening, a plate forming a valve having edge portions resting on said rails and sized to span and close said outlet opening, an actuating rod having a lower end, means loosely connecting said lower rod end to the valve near an edge thereof located adjacent said inclined bottom, said inclined bottom having an elongated slot spaced from the outlet through which a portion of said rod loosely extends, and the opposite upper end of the rod being disposed externally of said inclined bottom and being manually engaged for exerting a pull on the rod for moving the valve out of engagement with said rails to an open position along the inner side of said inclined bottom and to one side of the outlet opening.

No references cited.